Aug. 16, 1955  R. O. HOGE ET AL  2,715,534
WHEEL STEERING MECHANISM
Filed April 29, 1953  4 Sheets-Sheet 4

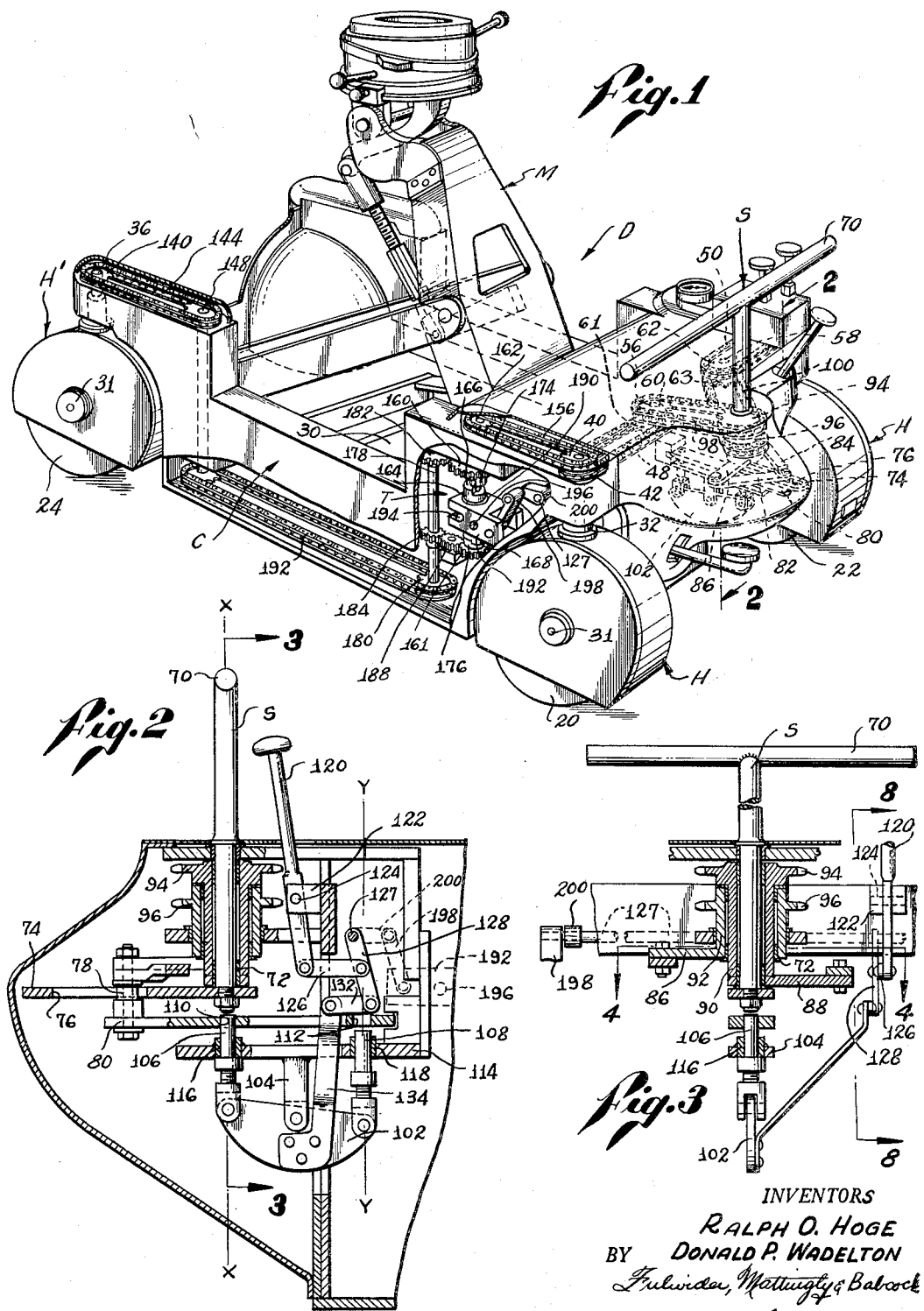

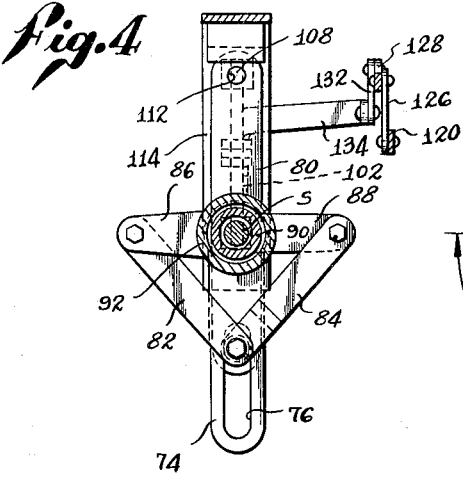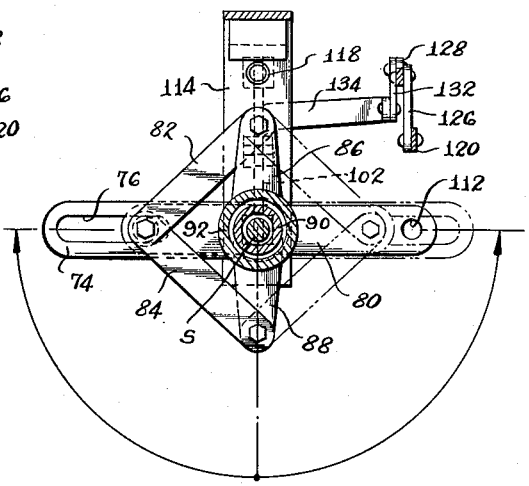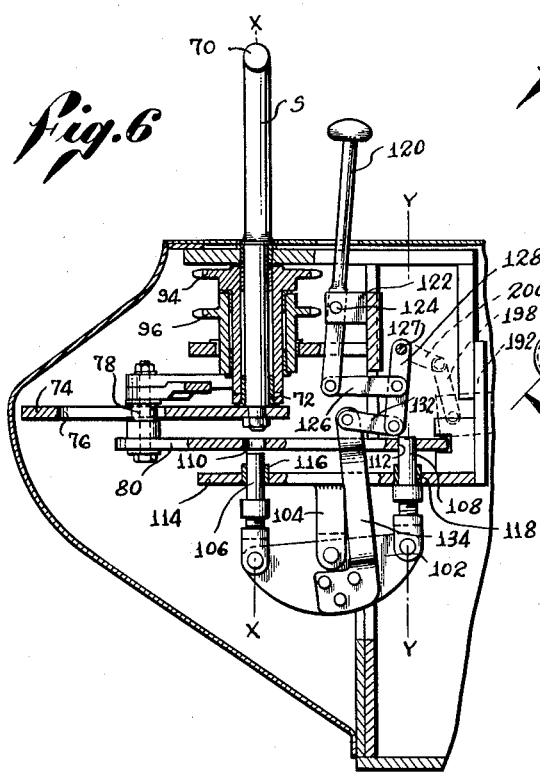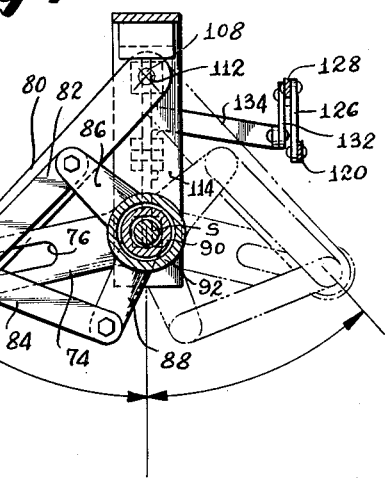

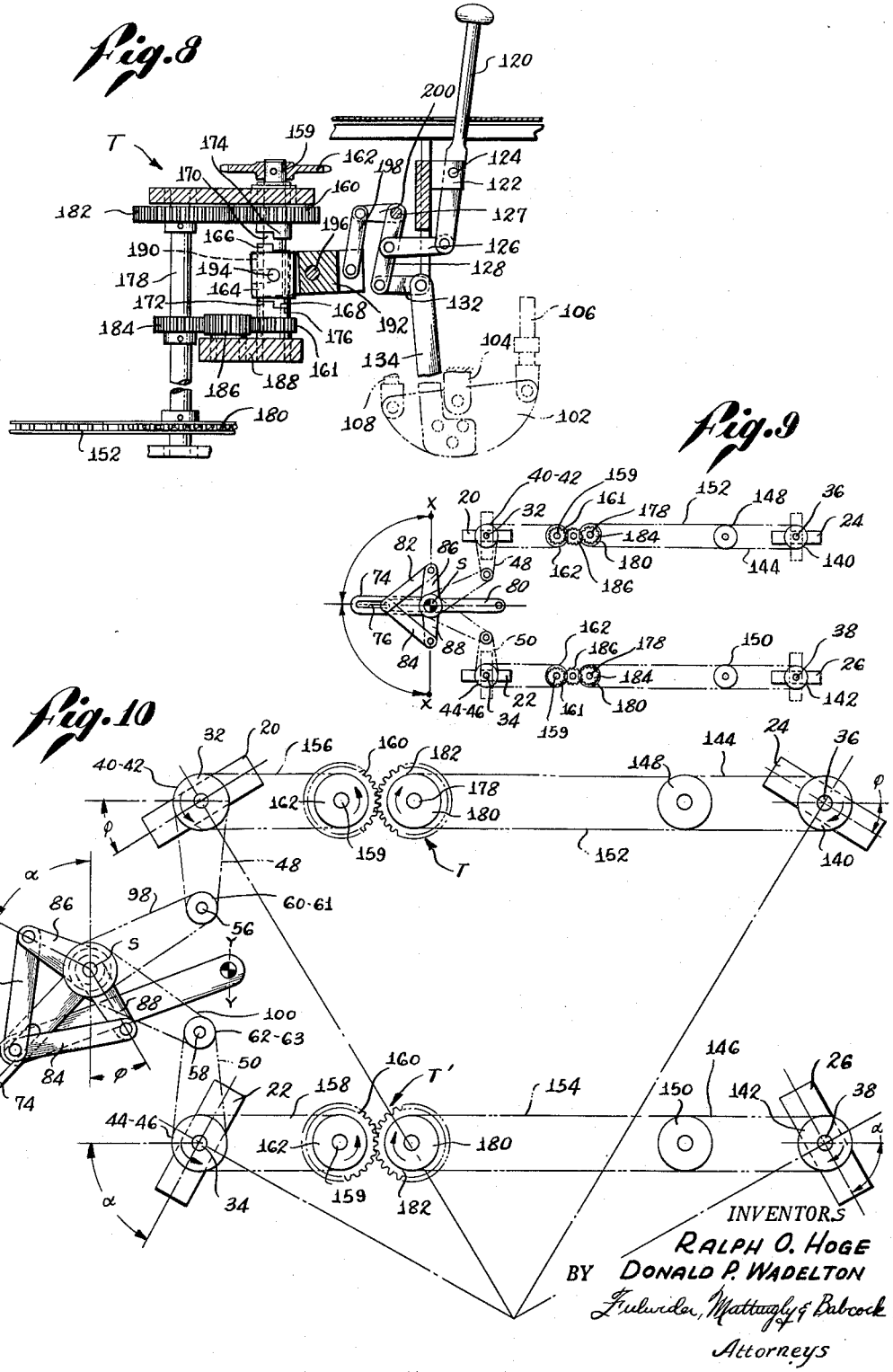

INVENTORS
RALPH O. HOGE
DONALD P. WADELTON
BY
Attorneys

United States Patent Office 2,715,534
Patented Aug. 16, 1955

2,715,534

WHEEL STEERING MECHANISM

Ralph O. Hoge, Los Angeles, and Donald P. Wadelton, North Hollywood, Calif., assignors to Thomas Rentals, Inc., Los Angeles, Calif., a corporation of California Application April 29, 1953, Serial No. 351,794

12 Claims. (Cl. 280—47.11)

The present invention relates generally to wheel steering mechanisms and more particularly to a novel steering mechanism especially adapted to be incorporated in a camera dolly for steering the wheels thereof.

In the production of motion pictures and of television programs, the camera must often be moved relative to the subject or scene being photographed or televised. To this end, the camera is mounted on a wheeled carriage commonly termed a "camera dolly." In order to achieve the desired technical effects, it is sometimes necessary that the camera and hence the camera dolly be movable in a straight line under certain conditions, and in a curved path under other conditions. It is also essential that the camera always be supported without vibration or jar, even during the time its dolly is undergoing a change in direction.

A major object of the present invention is to provide a novel wheel steering mechanism which permits a vehicle wherein it is incorporated to undergo movement in either a linear direction or in a curved path.

It is another object to provide a novel wheel steering mechanism for a camera dolly which permits a camera mounted thereby to be moved without vibration or jar even while its dolly is undergoing a change in direction.

A further object of the invention is to provide a steering mechanism for a camera dolly which is so connected to the wheels thereof that at the operator's choice these wheels will remain parallel to one another as they are turned, or else the wheels on one side of the dolly may be turned in opposite directions at a certain angle while the wheels on the other side of the dolly may be turned in opposite directions at a different angle. When the wheels remain parallel to one another, the camera dolly may undergo linear movement and when the wheels are turned in opposite directions, the dolly may follow a curved path having a very small radius of curvature.

Another object is to provide a wheel steering mechanism of the nature described which requires actuation of but a single control to effect a change from linear movement of the vehicle wherein it is installed to curved-path movement thereof.

Yet a further object is to provide a wheel steering mechanism of the nature described which is rugged of construction and relatively simple in operation whereby it may provide a long and trouble-free service life.

These and other objects of the present invention will become apparent from the following detailed description of a preferred embodiment thereof, when taken in conjunction with the appended drawings wherein:

Figure 1 is a general perspective view of a camera dolly wherein is incorporated a preferred form of steering mechanism embodying the present invention;

Figure 2 is an enlarged vertical sectional view taken on line 2—2 of Figure 1;

Figure 3 is a vertical sectional view taken on line 3—3 of Figure 2;

Figure 4 is a horizontal sectional view taken on line 4—4 of Figure 3;

Figure 5 is a top plan view similar to Figure 4 but showing the parts thereof disposed in a different position;

Figure 6 is a vertical sectional view similar to Figure 2, but showing the parts thereof disposed in a different position;

Figure 7 is a horizontal sectional view similar to Figures 4 and 5, but showing the parts thereof disposed in yet another position;

Figure 8 is a vertical sectional view taken on line 8—8 of Figure 3;

Figure 9 is a reduced diagrammatic top view of the apparatus, and illustrating one mode of operation thereof;

Figure 10 is an enlarged diagrammatic top view of the apparatus but showing another mode of operation thereof.

Figure 11:
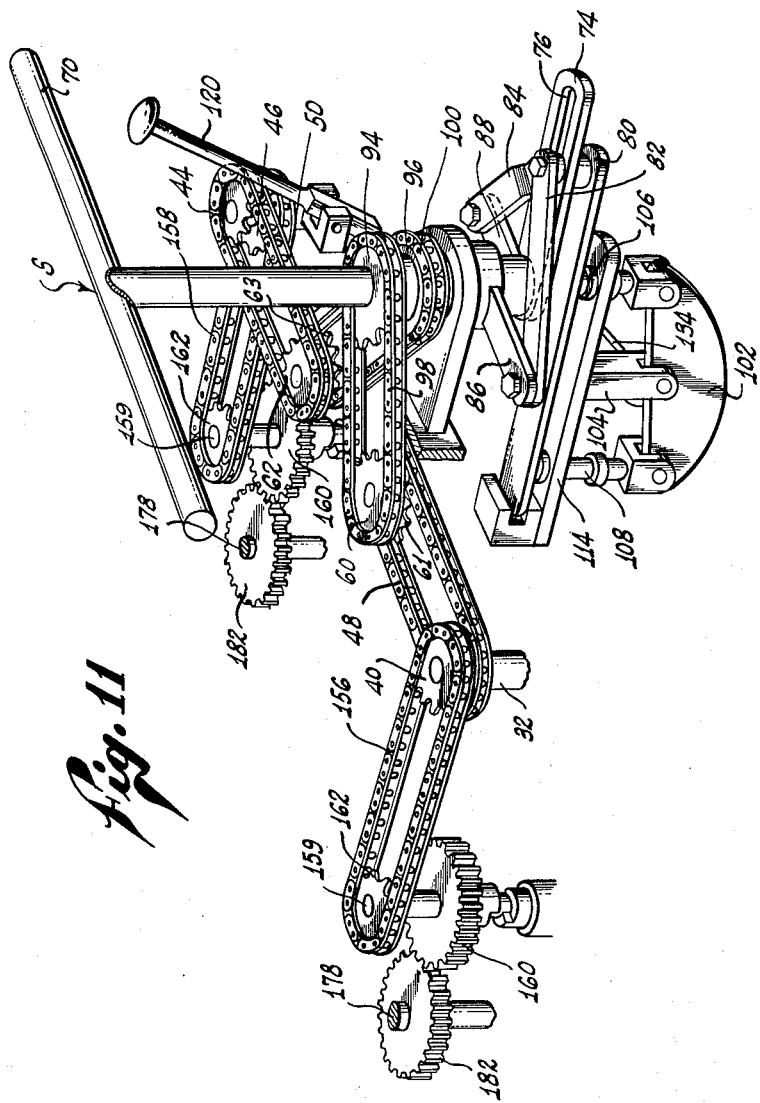
Figure 11 is a perspective view of the steering mechanism, with the housing removed, and showing the parts in their relative positions.

Referring to the drawings and particularly to Figure 1 thereof, there is shown a camera dolly D which incorporates a preferred form of wheel steering mechanism embodying the present invention. This camera dolly broadly comprises a chassis C supported by a pair of front wheels 20 and 22 and a pair of rear wheels 24 and 26, which wheels are adapted to be steered by means of a steering post S disposed at the front end of the chassis C. The steering post S is so connected to the wheels that at the operator's choice the wheels may remain parallel to one another as they are steered whereby linear movement of the dolly in any direction is possible, or alternately, the wheels on one side of the chassis may be turned in opposite directions at a certain angle, while the wheels on the other side of the chassis will simultaneously be turned in opposite directions at a different angle. In the latter case, the dolly may be turned about a radius of curvature that is quite small.

More particularly, the chassis C includes a platform 30 whereon is disposed conventional camera-supporting means M. Each of the sets of wheels 22 and 20, and 24 and 26 are mounted for rotation within housings H and H' by axles 31 secured between the side walls of each housing. The top of the front wheel housings H are individually supported by vertical shafts 32 and 34, which shafts are journalled to the front end of the chassis C whereby the front wheels are each turnable about the vertical axis directly over their axis of rotation. Similarly, the tops of the rear housings H' are individually supported by vertical shafts 36 and 38 journalled to the rear end of the chassis whereby the rear wheels are each turnable about a vertical axis directly over their axis of rotation.

The upper end of the right front shaft 32 mounts a pair of sprockets 40 and 42, while the upper end of the right front shaft 34 mounts a similar pair of sprockets 44 and 46. The sprockets 40 and 44 are connected by chains 48 and 50 to a pair of vertical sub-shafts 56 and 58, respectively, journalled by the front end of the chassis at points equidistant from the longitudinal center line thereof. Each of the sub-shafts 56 and 58 also mount sprockets designated 60 and 61, and 62 and 63, respectively.

With particular reference to Figs. 2 through 7, the steering post S includes a transverse handle 70 at its upper end, and is journalled by bearing 72 at its lower portion for rotation about a vertical axis. The lower end of the steering post rigidly mounts a forwardly extending arm 74, which arm is formed with a longitudinally extending slot 76. Extending upwardly through the slot 76 in sliding relationship thereto is a stud 78 that is affixed at its lower end to a rearwardly extending lever 80; the upper end of the stud 78 being pivotally connected to the front end of a pair of angularly disposed links 82 and 84. The rear ends of links 82 and 84 are pivotally connected to the outer ends of ears 86 and 88, respectively. The inner end of the ear 88 is integral with an inner sleeve 90 which is journalled for rotation about the axis of the steering post S, while the inner end of the other ear 86 is integral with an outer sleeve 92 which is in turn concentric to and journalled for rotation about the inner sleeve 90. The upper end of the inner sleeve 90 integrally mounts a sprocket 94, while the outer sleeve 92 integrally mounts a similar sprocket 96. The sprocket 94 is connected by means of a chain 98 to the sprocket 60 keyed to the right subshaft 56, and sprocket 96 is connected by means of a chain 100 to the sprocket 62 keyed to the left sub-shaft 58.

Below the steering post S a longitudinally extending rocker element 102 is pivotally mounted at its mid-portion to the lower end of a bracket 104 rigidly secured to the front end of the chassis C. An upwardly extending pin 106 is pivotally carried by the front of the rocker element 102, while a second upwardly extending pin 108 is pivotally carried by the rear of this element. Alternately, the front pin 106 is insertable into a first bore 110 formed in the intermediate portion of the lever 80, or the rear pin 108 is insertable into a second bore 112 formed in the rear portion of this lever. In order to guide these pins there is provided a fixed longitudinally extending brace 114 which is formed at its front portion with a guide collar 116 for slidably supporting the front pin 106, and which is formed at its rear portion with a similar guide collar 118 for slidably supporting the rear pin 108.

To shift the rocker element 102 between its position of Figure 2 and Figure 6, there is provided an upstanding shifting column 120 which is pivotally secured at its intermediate portion to a fixed bracket 122 by a horizontal pivot pin 124. At its lower end, the shifting column 120 is pivotally connected to the front and of a link element 126. The rear end of this link element 126 is in turn pivotally secured to the intermediate portion of an arm 128 that is keyed at its upper end to a horizontal bar 127. This bar 127 extends across and is journalled by the chassis C. The lower end of the arm 128 is pivotally connected to the rear end of a short link 132; being the front end of this short link 132 being pivotally connected to the upper end of an upright shifting arm 134. The lower end of this shifting arm is rigidly affixed to the rocker element 102. With this arrangement, when the shifting column 120 is disposed in its forward position of Fig. 2, the front pin 106 will be positioned within the first bore 110 of the lever 80; the front end of the rocker element 102 being raised. If the shifting column 102 is urged rearwardly to its position of Figure 6, the rocker element will be tilted in a counterclockwise direction so that the front pin 106 will be withdrawn downwardly from the lever bore 110 and the rear pin 108 will be urged upwardly into the lever bore 112, as shown in this figure.

When the front pin 106 is disposed in the front lever bore 110, rotation of the steering post S will cause the lever 80 to be rotated in a horizontal plane about a vertical axis extending through the steering post, the front lever bore 110, and the front pin 106; which axis is hereinafter referred to as the linear-motion axis, and is designated XX in the drawings. When the rear pin 108 is disposed in the rear lever bore 112, however, rotation of the steering post will cause the lever to be rotated about a second vertical axis located rearwardly of the steering post and extending through the second pin 108; which axis is hereinafter referred to as the curved-motion axis, and is designated YY in the drawings. It should be observed that whenever movement of the lever 80 about the linear-motion axis takes place, the dolly wheels will remain parallel to one another as they are steered, but when such lever movement takes place about the curved-motion axis, the wheels on one side of the chassis C will turn in opposite directions at a certain angle and the wheels on the other side of the chassis will simultaneously be turned in opposite directions at another angle.

Referring to Figures 2 through 5 and 9, when the front pin 106 is positioned within the front lever bore 110, rotation of the steering post S will effect concurrent rotation of the arm 74. Rotation of this arm will be transferred by the stud 78 to the lever 80 thereby causing the latter to rotate about the linear-motion axis XX. The links 82 and 84, and ears 86 and 88, which in turn drive the sprockets 94 and 96, will concurrently be forced to move in a curved path about this axis XX, thereby effecting rotation of the sprockets through an equal number of degrees in the same direction. Rotation of these sprockets will be transferred to the sprockets 60 and 62 by chains 98 and 100, respectively. Rotation of the sprockets 60 and 62 is in turn transferred by chains 48 and 50 to the front sprockets 40 and 44, mounted by the vertical shafts 32 and 34. In this manner, rotation of the steering post S will cause the front wheels 20 and 22 to be turned in the same direction, and through the same number of degrees.

Referring now to Figures 6, 7 and 10, when the rear pin 108 is positioned within the rear lever bore 112, rotation of the steering post and hence of the arm 74 will be transferred by the stud 78 to the lever 80, thereby causing the latter to rotate about the curved-motion axis Y—Y. During such rotation, the stud 78 will be caused to move forwardly in the slot 76 because of a difference in the centers of rotation of the links 82 and 84. Said forward movement of the stud will cause the front ends of the links 82 and 84 to be moved forwardly; the link 82 moving a greater distance than the link 84. This link movement will effect rotation of the ears 86 and 88, and hence rotation of the sprockets 94 and 96 through an uneven number of degrees. The rotation of these sprockets will be transferred to the sprockets 60 and 62 by chains 98 and 100, respectively, and to the front sprockets 40 and 44 by the chains 48 and 50, to thereby effect turning of the front wheels 20 and 22 in the same direction but through an unequal number of degrees, as indicated in Figure 10.

As mentioned previously herein, the steering post S is adapted to steer the rear wheels 24 and 26 as well as the front wheels 20 and 22. To this end, the top of the rear vertical shafts 36 and 38 mount sprockets 140 and 142 respectively, that are connected to the front sprockets 40 and 44 by means of rear chains 144 and 146, a pair of idler sprocket assemblies 148 and 150, intermediate chains 152 and 154, transfer mechanisms T and T', and front chains 156 and 158. The transfer mechanisms T and T' control the direction of rotation of the intermediate chains 152 and 154, with respect to the front chains 156 and 158, whereby the rear wheels will be caused to turn in either the same direction as the front wheels or in the opposite direction therefrom.

Referring now to Figure 8, the transfer mechanisms T and T' are of identical construction and each includes a vertical main shaft 159 to the upper end of which is secured a sprocket 162 that is engaged with the front chain 156. The main shaft 159 rotatably journals an upper gear 160 and a lower gear 161; the lower gear having a smaller diameter than the upper gear. The intermediate portion of the main shaft 159 carries a drive sleeve 164 formed with a semi-circular projection 166 at its upper end and a similar semi-circular projection 168 at its lower end. This drive sleeve is free to move axially relative to the main shaft 159, but is locked against rotation relative thereto in a manner to be set forth hereinafter. The projections 166 and 168 are adapted to be selectively inserted within complementary semi-circular recesses 170 and 172 respectively, formed on a pair of driven sleeves 174 and 176. These driven sleeves are integrally affixed to the upper gear 160 and to the lower gear 161, respectively.

The transfer mechanisms also include a second vertical shaft 178 rotatably journalled to the chassis rearwardly of the main shaft 159. The lower end of this shaft 178 is rigidly secured to a sprocket 180 that is engaged with the front of the intermediate chain 152. Keyed to the upper end of this shaft 178 is an upper gear 182 that is constantly meshed with the upper gear 160 mounted by the main shaft 159. A smaller gear 184 is also keyed to the intermediate portion of the shaft 178, which smaller gear is meshed with an idler gear 186. This idler gear is journalled by a fixed element 188 secured to the chassis and meshed with the lower gear 161 of the main shaft 159.

The drive sleeve 164 is adapted to be positioned either with its upper projection 166 disposed within the recess 170 of the upper driven sleeve 174, or with its lower projection 168 disposed within the recess 172 of the lower driven sleeve 178. When the latter condition exists, rotation of the main shaft 159 will be transferred to the shaft 178 by means of idler gear 186 and gear 184, as shown in Figure 8. Because of the presence of this idler gear, the shaft 178 will rotate in the same direction as the main shaft 159. Rotation of the shaft 178 effects concurrent rotation of the idler sprocket assembly 148 through intermediate chain 152, which rotation in turn effects concurrent rotation of the rear shaft sprocket 140. This latter sprocket 140 will rotate in the same direction as the main shaft 159 of the transfer mechanism T and the front shaft 32. Accordingly, the rear wheel 24 will turn in the same direction and through the same angle as the front wheel 20. When, on the other hand, the drive sleeve 164 is positioned with its lower projection 168 disposed within the recess 172 of the lower driven sleeve 176, rotation of the main shaft 159 will be transferred to the rear shaft 178 by means of the two upper gears 160 and 182. Such rotation will take place in opposite directions and hence the rear wheel 24 will turn in the opposite direction, but through an equal number of degrees as the front wheel 20.

As shown in Figures 1 and 8, each of the drive sleeves is journalled within a support sleeve 190, which latter sleeve is pivotally attached to the rear of a carrier member 192 by horizontal pins 194. The mid-portion of each of the carrier members 192 is pivotally mounted to the chassis C by a horizontal pivot pin 196. The front of each carrier member 192 is pivotally connected to the lower end of vertically extending element 198, which element in turn is pivotally connected at its upper end to a short link 200. The links 200 are keyed to opposite sides of the horizontal, transversely extending bar 127, mentioned previously hereinbefore, which bar is journalled by the chassis C. With this arrangement, the forward and rearward movement of the shifting column 120 will effect concurrent rotation of the bar 127 and hence movement of the links 200 about the axis of this bar. Such movement of these links will in turn effect pivotal movement of the vertically extending elements 198 and hence bring about a rocking movement of the carrier members 192 about their pins 196. In this manner, the carrier members will shift the drive sleeves 164 between their upper and lower positions. It should be particularly noted that the linkage between the shifting column 120 and the drive sleeves is so arranged that at such time as the shifting column is in its forward position of Figures 2 and 8, the drive sleeves will be in their lower position, and when the shifting column is disposed in its rearward position of Figure 6, the drive sleeves will be disposed in their upper position.

In operation, assuming that the camera dolly is to undergo linear movement, the shifting column 120 will be disposed in its forward position of Figures 2 and 8. The front pin 106 will then be inserted within the front bore 110 of the lever 80 and rotation of the steering post S will cause the lever 80 to be rotated about the linear-motion axis X—X. As explained previously hereinbefore, such rotation of the lever 80 about this axis will effect rotation of the front wheels 20 and 22 through an equal number of degrees and in the same direction. During this time, the transfer mechanisms T and T' will have their parts arranged as shown in Figure 8. Accordingly, the rear wheels 24 and 26 will be caused to turn through the same number of degrees and in the same direction as the front wheels. This mode of operation is diagrammatically indicated in Figure 9.

When it becomes desirable to have the camera dolly follow a curved path, the shifting lever 120 is moved to its rearward position of Figure 6. Such movement will withdraw the front pin 106 from the front bore 110 of lever 80 and cause the rear pin 108 to be inserted within the rear bore 112. Rotation of the steering post S will then cause the lever 80 to be rotated about the curved-motion axis Y—Y. As explained previously hereinbefore, such rotation of the lever 80 about this axis will effect rotation of the front wheels 20 and 22 through an unequal number of degrees but in the same direction. As the shifting column 120 is moved to its rearward position, the drive sleeves 164 of the transfer mechanisms T and T' will be caused to move upwardly whereby their projections 166 will engage the recesses 170 of the driven sleeves 174. In this manner, the direction of rotation of the rear wheels relative to the front wheels will be reversed. This mode of operation is diagrammatically indicated in Figure 10. Each of the wheels will then be tangent to an arc drawn about a center common to all four wheels. With this arrangement, the wheels may rotate substantially without skidding while the dolly is executing a turn. Accordingly, very little jar or vibration will take place. Additionally, the dolly may be turned about a very short radius of curvature.

It will be seen that a camera carried by the dolly D may be moved in any straight line toward, away from, parallel to, and at any angle to a subject being photographed or televised. The camera may also be made to follow a curved path relative to such subject. A change from linear motion to curved-line motion may be readily effected by merely moving the shifting column 120. All movements of the dolly may be effected without jar. Although the novel steering mechanism of the present invention has been shown and described as embodied in a camera dolly, it will be apparent that such mechanism is adapted to be utilized with other types of wheeled vehicles. It will likewise be apparent that various modifications and changes may be made with respect to the form of construction illustrated herein without departing from the spirit of the invention or the scope of the following claims.

We claim:

1. A steering mechanism for a chassis, comprising: a pair of steerable front wheels mounted by the front portion of said chassis; a pair of steerable rear wheels mounted by the rear portion of said chassis; a steering post mounted by said chassis; motion-transferring means connecting said steering post solely to said front wheels, said means when disposed in a first position permitting said front wheels to be simultaneously steered in the same direction and through the same angle, and said means when in a second position permitting said front wheels to be steered in the same direction but with one wheel being turned through a greater angle than the other; a pair of connecting means each connecting the front wheel on one side to the rear wheel on the same side; transfer mechanism means interposed in each said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels; and shifting means for simultaneously moving said motion-transferring means and said transfer mechanism means from said first position to said second position.

2. A steering mechanism for a chassis, comprising: a pair of steerable front wheels mounted by the front portion of said chassis; a pair of steerable rear wheels mounted by the rear portion of said chassis; a steering post mounted by said chassis; an arm secured to said post, said arm being formed with a slot; a lever parallel to said arm and mounting a stud at one of its ends that is slidably disposed within said slot; an inner sleeve coaxial with said post and formed with a radially extending ear; an outer sleeve concentric to said inner sleeve and formed with a second radially extending ear; a pair of angularly disposed links pivotally interposed between said ears and said stud; a rocker element which when disposed in a first position supports said lever for pivotal movement about an axis aligned with said post, and which when disposed in a second position supports said lever for pivotal movement about an axis that is longitudinally spaced from the opposite side of said post relative to said one end of said lever; means connecting said inner sleeve to one of said front wheels whereby the latter may be steered by rotation of said post; means connecting said outer sleeve to the other of said front wheels, whereby the latter may be steered by rotation of said post; connecting means between said front pair of wheels and said rear pair of wheels; and transfer mechanism means interposed in said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels.

3. A steering mechanism for a chassis, comprising: a pair of steerable front wheels mounted by the front portion of said chassis; a pair of steerable rear wheels mounted by the rear portion of said chassis; a steering post mounted by said chassis; an arm secured to said post, said arm being formed with a slot; a lever parallel to said arm and mounting a stud at one of its ends that is slidably disposed within said slot; an inner sleeve coaxial with said post and formed with a radially extending ear; an outer sleeve concentric to said inner sleeve and formed with a second radially extending ear; a pair of angularly disposed links pivotally interposed between said ears and said stud; a rocker element which when disposed in a first position supports said lever for pivotal movement about an axis aligned with said post, and which when disposed in a second position supports said lever for pivotal movement about an axis that is longitudinally spaced from the opposite side of said post relative to said one end of said lever; means connecting said inner sleeve to one of said front wheels whereby the latter may be steered by rotation of said post; means connecting said outer sleeve to the other of said front wheels, whereby the latter may be steered by rotation of said post; connecting means between said front pair of wheels and said rear pair of wheels; transfer mechanism means interposed in said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels; and shifting means for simultaneously moving said rocker element and said transfer mechanism means from said first position to said second position.

4. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a forwardly extending arm secured to said post, said arm being formed with a longitudinal slot; a longitudinally extending lever below said arm and mounting a stud at its front end that is slidably disposed within said slot; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element which when disposed in its first position supports said lever for horizontal pivotal movement about a vertical axis aligned with said post, and which when disposed in its second position supports said lever for horizontal pivotal movement about a vertical axis disposed rearwardly of but in longitudinal alignment with said post; means connecting said inner sleeve to one of said front wheels whereby the latter may be steered by rotation of said post; means connecting said outer sleeve to the other of said front wheels whereby the latter may likewise be steered by rotation of said post; connecting means between said front pair of wheels and said rear pair of wheels; and transfer mechanism means interposed in said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels.

5. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a forwardly extending arm secured to said post, said arm being formed with a longitudinal slot; a longitudinally extending lever below said arm and mounting a stud at its front end that is slidably disposed within said slot; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element which when disposed in its first position supports said lever for horizontal pivotal movement about a vertical axis aligned with said post, and which when disposed in its second position supports said lever for horizontal pivotal movement about a vertical axis disposed rearwardly of but in longitudinal alignment with said post; means connecting said inner sleeve to one of said front wheels whereby the latter may be steered by rotation of said post; means connecting said outer sleeve to the other of said front wheels whereby the latter may likewise be steered by rotation of said post; connecting means between said front pair of wheels and said rear pair of wheels; transfer mechanism means interposed in said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels; and shifting means for simultaneously moving said rocker element and said transfer mechanism means between their first and second positions.

6. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a forwardly extending arm secured to said post, said arm being formed with a longitudinal slot; a normally longitudinally extending lever below said arm and mounting a stud at its front end that is slidably disposed within said slot, a front bore formed in said lever in alignment with said post and a rear bore formed in said lever at a point spaced rearwardly of said post; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element pivotally mounted to said chassis below said lever, said rocker element having an upwardly extending front pin secured to its front end and an upwardly extending rear pin secured to its rear end, and said rocker element being rockable between a first position wherein said front pin is inserted within said front bore of said lever and a second position wherein said second pin is inserted within said rear bore of said lever; means connecting said inner sleeve to one of said front wheels whereby the latter may be steered by rotation of said post; means connecting said outer sleeve to the other of said front wheels whereby the latter may likewise be steered by rotation of said post; connecting means between said front pair of wheels and said rear pair of wheels; and transfer mechanism means interposed in said connecting means, said transfer mechanism means when disposed in a first position permitting said rear wheels to be simultaneously steered in the same direction as said front wheels, and said transfer mechanism means when in a second position permitting said rear wheels to be steered in the opposite direction from said front wheels.

7. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a normally longitudinally extending lever below said arm and mounting a stud at its front end that is slidably disposed within said slot, a front bore formed in said lever in alignment with said post and a rear bore formed in said lever at a point spaced rearwardly of said post; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element pivotally mounted to said chassis below said lever, said rocker element having an upwardly extending front pin secured to its front end and an upwardly extending rear pin secured to its rear end, and said rocker element being rockable between a first position wherein said front pin is inserted within said front bore of said lever and a second position wherein said second pin is inserted within said rear bore of said lever; chain and sprocket means connecting said inner sleeve to one of said front wheels and said outer sleeve to the other of said front wheels; auxiliary chain and sprocket means connecting each of said front wheels to the rear wheel on the same side of the chassis; a transfer mechanism interposed in each of said auxiliary chain and sprocket means, said transfer mechanisms when disposed in a first position permitting each rear wheel to be simultaneously steered in the same direction as its corresponding front wheel, and when disposed in a second position permitting each rear wheel to be steered in the opposite direction from its corresponding front wheel; and shifting means for simultaneously moving said rocker element and said transfer mechanisms between said first and second positions.

8. A steering mechanism for a chassis, comprising: a pair of steerable front wheels mounted by the front portion of said chassis; a pair of steerable rear wheels mounted by the rear portion of said chassis; a steering post mounted by said chassis; means connecting said steering post to said front wheels whereby they may selectively be simultaneously steered in the same direction through an equal number of degrees or alternately in the same direction but through an unequal number of degrees; and a transfer mechanism interposed between each of said front wheels and its corresponding rear wheel, said transfer mechanisms each including a main shaft connected to said front wheel, a parallel rear shaft connected to said rear wheel, a first pair of aligned gears connected to said shafts but separated by an idler gear, a second pair of aligned and meshed gears connected to said shafts, and a drive sleeve axially slidably carried by and keyed to said main shaft, said drive sleeve when in its first position causing rotation of said main shaft to be transmitted to said rear shaft through said first gears and when in its second position causing rotation of said main shaft to be transmitted to said rear shaft through said second gears.

9. A steering mechanism for a chassis, comprising: a pair of steerable front wheels mounted by the front portion of said chassis; a pair of steerable rear wheels mounted by the rear portion of said chassis; a steering post mounted by said chassis; motion-transferring means connecting said steering post to said front wheels, said means being selectively movable to a first position permitting said front wheels to be simultaneously steered in the same direction and through the same angle, or to a second position permitting said front wheels to be steered in the same direction but with one wheel being turned through a greater angle than the other; a transfer mechanism interposed between each of said front wheels and its corresponding rear wheel, said transfer mechanisms each including a main shaft connected to said front wheel, a parallel rear shaft connected to said rear wheel, a first pair of aligned gears connected to said shafts but separated by an idler gear, a second pair of aligned and meshed gears connected to said shafts, and a drive sleeve axially slidably carried by and keyed to said main shaft, said drive sleeve when in its first position causing rotation of said main shaft to be transmitted to said rear shaft through said first gears and when in its second position causing rotation of said main shaft to be transmitted to said rear shaft through said second gears; and shifting means for simultaneously moving said motion-transferring means and said drive sleeve between their first and second positions.

10. A steering mechanism for a chassis, comprising: a pair of steerable front wheels mounted by the front portion of said chassis; a pair of steerable rear wheels mounted by the rear portion of said chassis; a steering post mounted by said chassis; an arm secured to said post, said arm being formed with a slot; a lever parallel to said arm and mounting a stud at one of its ends that is slidably disposed within said slot; an inner sleeve coaxial with said post and formed with a radially extending ear; an outer sleeve concentric to said inner sleeve and formed with a second radially extending ear; a pair of angularly disposed links pivotally interposed between said ears and said stud; a rocker element which when disposed in a first position supports said lever for pivotal movement about an axis aligned with said post, and which when disposed in a second position supports said lever for pivotal movement about an axis that is longitudinally spaced from the opposite side of said post relative to said one end of said lever; means connecting said inner sleeve to one of said front wheels whereby the latter may be steered by rotation of said post; means connecting said outer sleeve to the other of said front wheels whereby the latter may be steered by rotation of said post; a transfer mechanism interposed between each of said front wheels and its corresponding rear wheel, said transfer mechanisms each including a main shaft connected to said front wheel, a parallel rear shaft connected to said rear wheel, a first pair of aligned gears keyed to said shafts but separated by an idler gear, a second pair of aligned and meshed gears, and a drive sleeve axially slidably carried by and keyed to said main shaft, said drive sleeve when in its first position causing rotation of said main shaft to be transmitted to said rear shaft through said first gears and when in its second position causing rotation of said main shaft to be transmitted to said rear shaft through said second gears; and shifting means for simultaneously moving said rocker element and said drive sleeve between their first and second positions.

11. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a forwardly extending arm secured to said post, said arm being formed with a longitudinal slot; a longitudinally extending lever below said arm and mounting a stud at its front end that is slidably disposed within said slot; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element which when disposed in its first position supports said lever for horizontal pivotal movement about a vertical axis aligned with said post, and which when disposed in its second position supports said lever for horizontal pivotal movement about a vertical axis disposed rearwardly of but in longitudinal alignment with said post; means connecting said inner sleeve to one of said front wheels whereby the latter may be steered by rotation of said post; means connecting said outer sleeve to the other of said front wheels whereby the latter may likewise be steered by rotation of said post; a transfer mechanism interposed between each of said front wheels and its corresponding rear wheel, said transfer mechanisms each including a main shaft connected to said front wheel, a parallel rear shaft connected to said rear wheel, a first pair of aligned gears keyed to said shafts but separated by an idler gear, a second pair of aligned and meshed gears, and a drive sleeve axially slidably carried by and keyed to said main shaft, said drive sleeve when in its first position causing rotation of said main shaft to be transmitted to said rear shaft through said first gears and when in its second position causing rotation of said main shaft to be transmitted to said rear shaft through said second gears; and shifting means for simultaneously moving said rocker element and said drive sleeve between their first and second positions.

12. A steering mechanism for a chassis, comprising: a pair of steerable front wheels mounted by the front portion of said chassis; a pair of steerable rear wheels mounted by the rear portion of said chassis; a vertically extending steering post journalled by the front portion of said chassis; a normally longitudinally extending lever below said arm and mounting a stud at its front end that is slidably disposed within said slot, a front bore formed in said lever in alignment with said post and a rear bore formed in said lever at a point spaced rearwardly of said post; an inner sleeve coaxial with said post and having an integral ear that extends transversely outwardly relative to one side of said post; an outer sleeve concentric with said inner sleeve and having an integral ear that extends transversely outwardly relative to the opposite side of said post; a pair of angularly disposed links pivotally interposed between said ears and said stud; a longitudinally extending rocker element pivotally mounted to said chassis below said lever, said rocker element having an upwardly extending front pin secured to its front end and an upwardly extending rear pin secured to its rear end, and said rocker element being rockable between a first position wherein said front pin is inserted within said front bore of said lever and a second position wherein said second pin is inserted within said rear bore of said lever; chain and sprocket means connecting said inner sleeve to one of said front wheels and said outer sleeve to the other of said front wheels; a transfer mechanism interposed between each of said front wheels and its corresponding rear wheel, said transfer mechanisms each including a vertical rotatable main shaft connected by chain and sprocket means to one of the front wheels, a parallel rotatable rear shaft connected by chain and sprocket means to one of the rear wheels, a first pair of aligned gears keyed to said shafts but separated by an idler gear, a second pair of aligned and meshed gears, and a drive sleeve axially slidably carried by and keyed to said main shaft, said drive sleeve when in its first position causing rotation of said main shaft to be transmitted to said rear shaft through said first gears and when in its second position causing rotation of said main shaft to be transmitted to said rear shaft through said second gears; and shifting means for simultaneously moving said rocker element and said drive sleeve between their first and second positions.

References Cited in the file of this patent

UNITED STATES PATENTS

| | | |
|---|---|---|
| 1,223,907 | Smith | Apr. 24, 1917 |
| 1,323,653 | Stewart | Dec. 2, 1919 |
| 1,681,893 | Barskell | Aug. 21, 1928 |
| 1,866,393 | Brooks | July 5, 1932 |
| 2,232,015 | Skok | Feb. 18, 1941 |
| 2,470,496 | Krilanovich | May 17, 1949 |

FOREIGN PATENTS

| | | |
|---|---|---|
| 451,813 | Great Britain | Aug. 12, 1936 |